Oct. 23, 1934.  F. H. SEBRING, JR., ET AL  1,977,699
APPARATUS FOR MANUFACTURING POTTERY WARE
Filed July 14, 1933  4 Sheets-Sheet 1
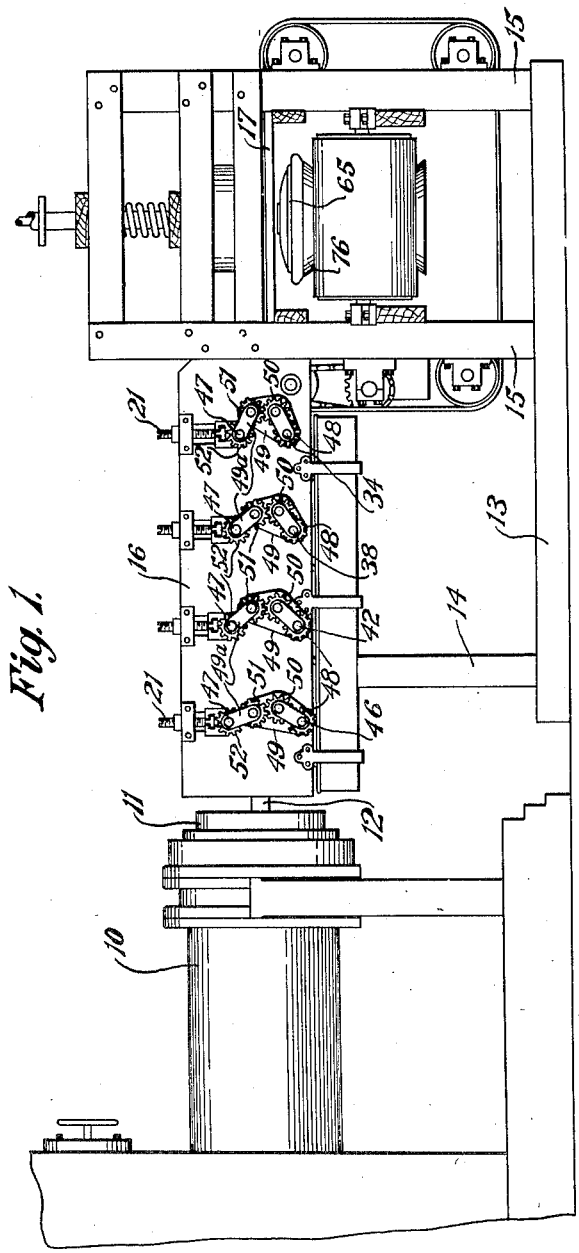
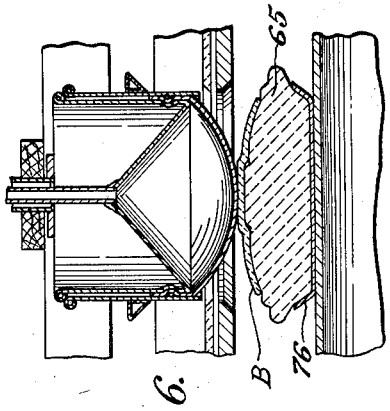
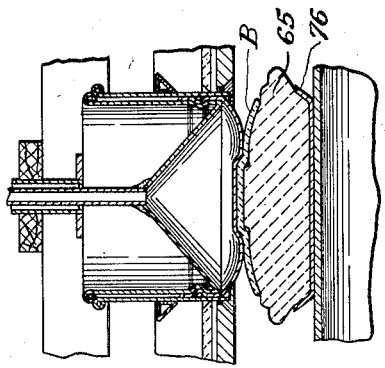
Inventors
F. H. Sebring Jr.
L. C. Loschky
J. T. Pugh
By Frease and Bishop
Attorneys Oct. 23, 1934.  F. H. SEBRING, JR., ET AL  1,977,699
APPARATUS FOR MANUFACTURING POTTERY WARE
Filed July 14, 1933  4 Sheets-Sheet 2
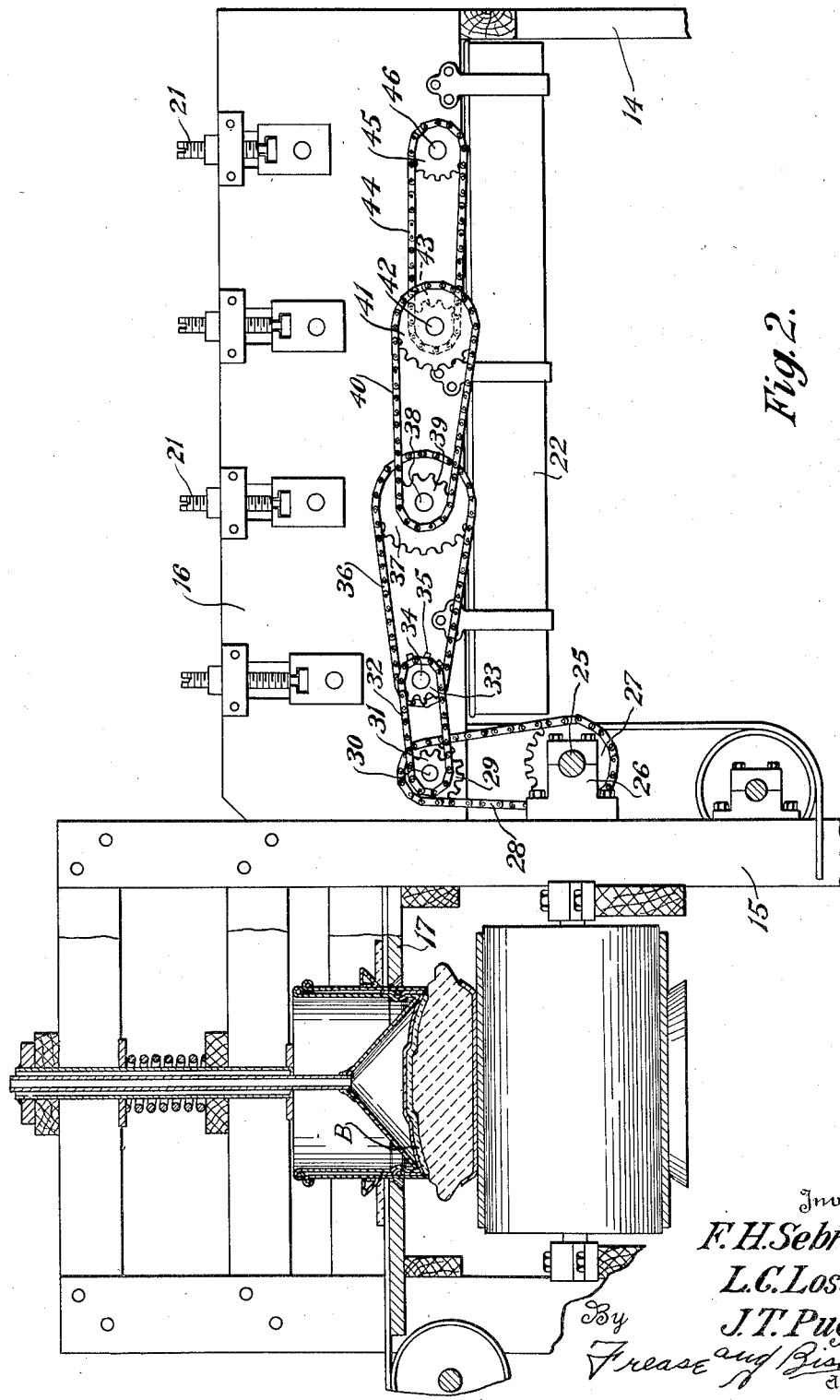

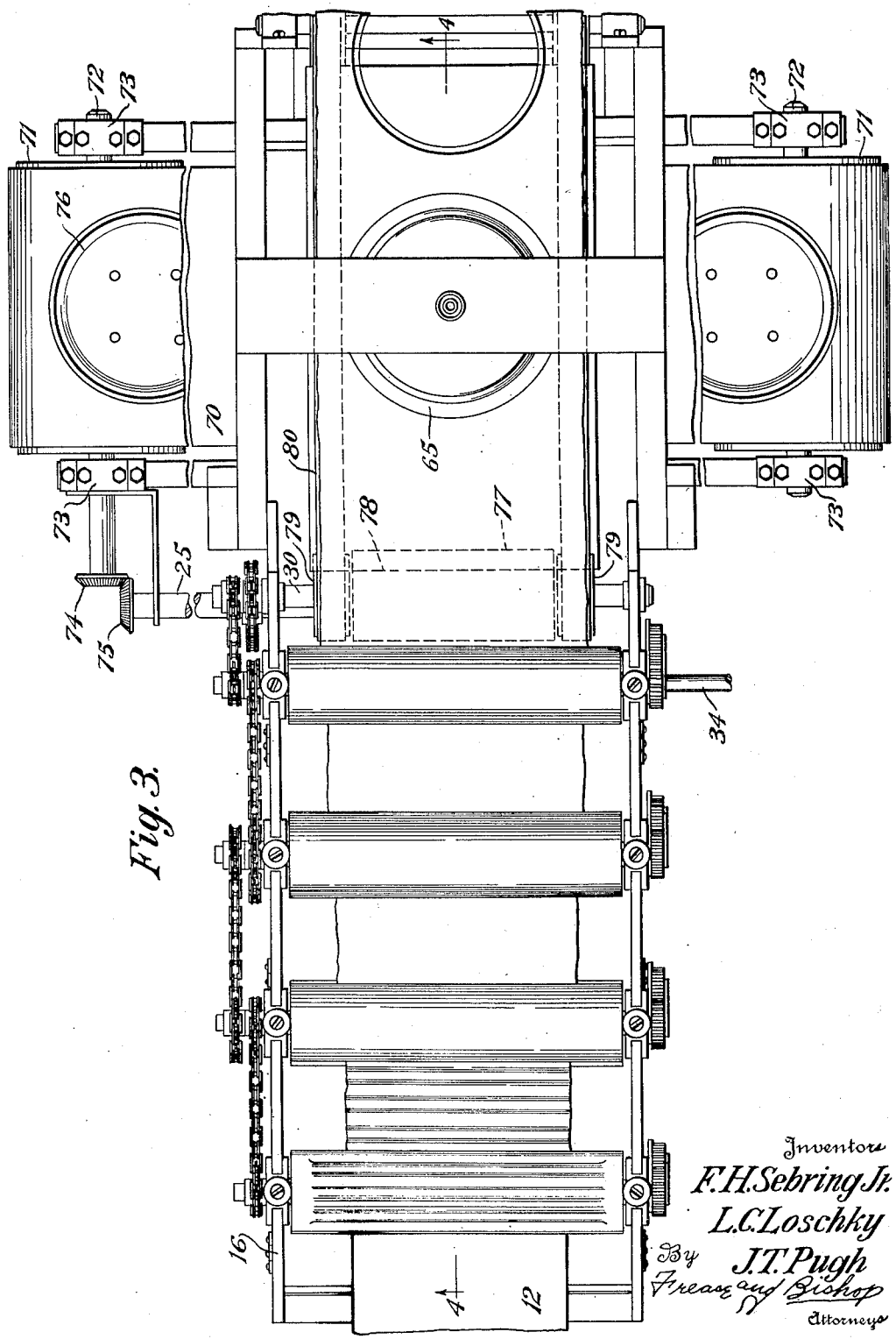

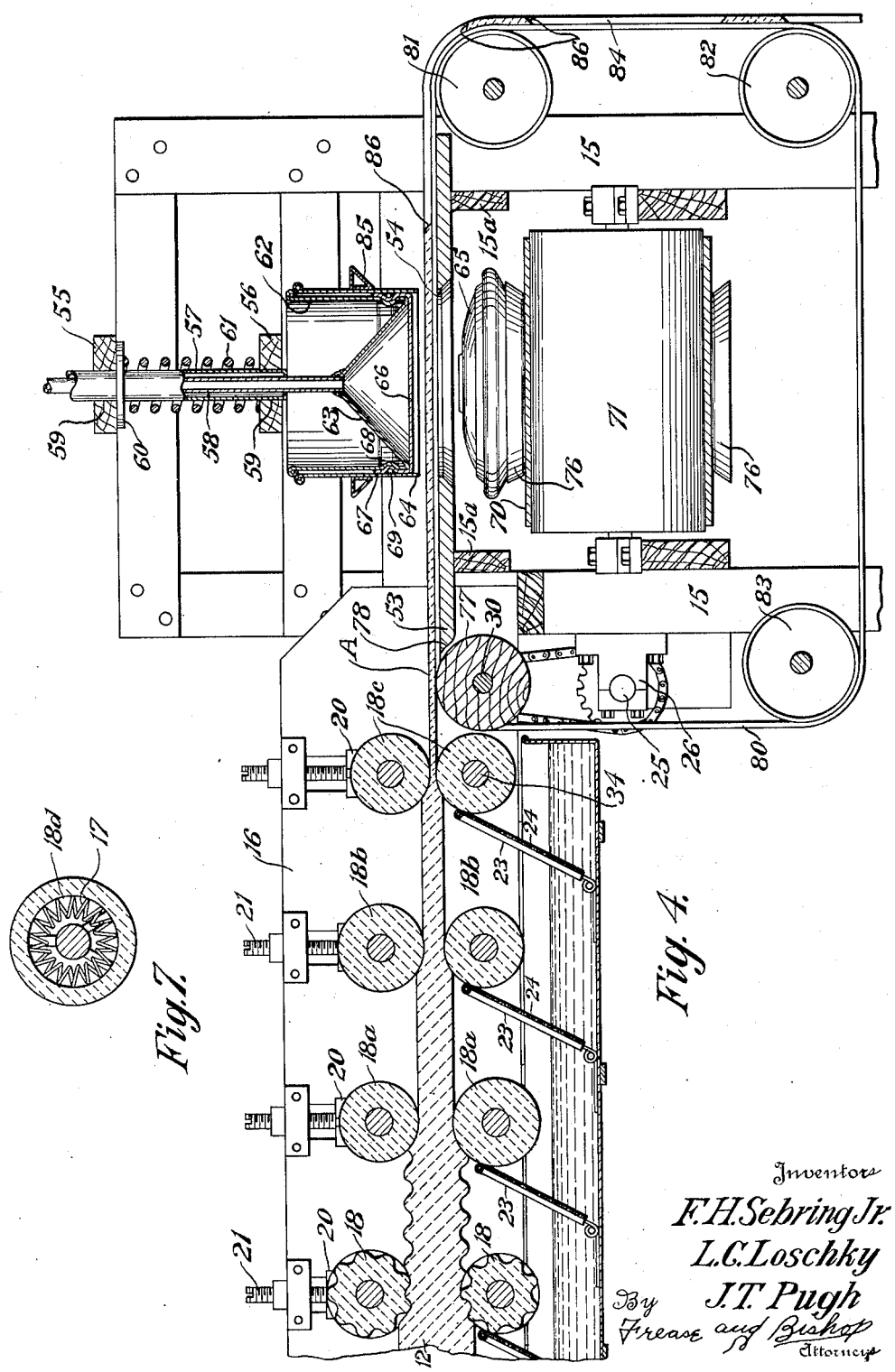

Patented Oct. 23, 1934

1,977,699

UNITED STATES PATENT OFFICE 1,977,699

APPARATUS FOR MANUFACTURING POTTERY WARE

Frank H. Sebring, Jr., Ludwig C. Loschky, and John T. Pugh, Salem, Ohio; said Loschky and said Pugh assignors to said Sebring Application July 14, 1933, Serial No. 680,386

11 Claims. (Cl. 25—24)

The invention relates to the manufacture of dinnerware and chinaware and more particularly to the preparation of the clay from which such ware is made as it goes from the pug mill to the molds.

Under present practice in the manufacture of pottery ware such as dinnerware and the like, the clay after being passed through a pug mill or the like is divided into balls of suitable size for the article to be formed, these balls of clay being placed one at a time upon a block and flattened by a manually wielded bat or mall to substantially the thickness desired, the flattened bat of clay thus formed being then placed by hand upon a mold which is placed upon a jigger where the clay is formed into the desired shape for the dinnerware or other article to be produced.

As the size of each clay ball is merely gauged by the eye and hand of the operator and the same is manually flattened and placed upon the mold, the desired uniformity in size and thickness of the bats of clay cannot be attained. Furthermore, this manual operation does not permit of obtaining a uniform texture, controlled molecular contact or controllable moisture content of the clay as it is prepared for the mold.

An object of the present improvement is to produce an apparatus for preparing clay for the manufacture of dinnerware, chinaware and the like so as to produce uniform texture in the clay as well as a controllable moisture content and controlled molecular contact, thereby excluding air from the clay and causing faster drying and burning and producing a tougher and higher quality product.

Another object is to provide means for receiving the clay from a pug mill or similar apparatus and rolling the clay into a strip or ribbon.

A further object is to provide means for cutting bats from said ribbon by means of a plunger of suitable size and shape to produce a bat of the size and shape required.

A further object is to provide rolls for rolling the clay ribbon, formed of or covered with moisture absorbing material.

A still further object is to provide means for lubricating the rolls to prevent the clay ribbon from adhering thereto.

Another object of the improvement is to provide a plurality of pairs of rolls for progressively reducing the thickness of the clay ribbon.

Still another object is to provide means for causing one roll of each pair to rotate at a different surface speed from the other roll of the pair, in order to cause a wiping or churning action within the clay, producing a uniform texture or structure of the clay ribbon, as well as reducing the cross section thereof.

A still further object of the improvement is to provide a table or carrier over which the ribbon or strip of clay is passed, the same being provided with an opening of the size and shape of the bat to be produced, a plunger provided with a cutter being located adjacent thereto and adapted to cut a bat from the strip or ribbon of clay and push the same downward through said opening.

Another object of the improvement is to provide a plunger having a flexible diaphragm for pressing the clay bat onto the mold in such a manner that the pressure progresses continuously from the center of the bat to the periphery thereof, until the entire bat is under pressure, thereby expelling all air from between the bat and the mold as well as tightly pressing the bat upon the mold and thereby forming the inside of the dish or other article.

Still another object of the improvement is to provide a pneumatic diaphragm upon the plunger for firmly pressing the clay bat upon the mold and causing uniform pressure to be exerted upon the entire surface of the bat, regardless of irregularities in the shape of the mold.

A further object is to provide means for moving the molds beneath the table or carrier over which the clay ribbon is passed and stopping each mold beneath the opening in said table in position to receive the bat of clay as it is cut from the ribbon and pushed downward through the opening by means of the plunger.

The above, together with other objects which will be obvious from the following description, may be attained by constructing and operating the apparatus in the manner hereinafter described and illustrated in the accompanying drawings, in which Figure 1 is a side elevation of the improved apparatus showing the same associated with a pug mill;

Fig. 2, an enlarged side elevation of the apparatus looking at the opposite side from that shown in Fig. 1, parts being shown in section;

Fig. 3, a plan view of the apparatus to which the invention pertains;

Fig. 4, a longitudinal sectional view taken as on the line 4—4, Fig. 3;

Fig. 5, a vertical sectional view of the plunger and mold showing the plunger near the lower limit of its stroke;

Fig. 6, a similar view showing the plunger near the upper limit of its stroke; and Fig. 7, a transverse section of a modified form of roll.

Similar numerals refer to similar parts throughout the several views of the drawings.

A pug mill is indicated generally at 10 and may be provided with a die 11 for feeding a substantially flat column 12 of clay to the apparatus to which the invention pertains. The machine may be mounted upon a base 13 upon which are located uprights 14 and 15 which support the side frames 16 and the table 17.

A plurality of pairs of rolls are journaled in suitable bearings in the side frames 16 and located therebetween. The first pair of these rolls, indicated at 18, are adapted to receive the clay as it comes from the pug mill or other machine in which it is mixed, and this pair of rolls may be corrugated, as shown in the drawings, in order to facilitate the feeding of the clay to the succeeding pairs of rolls.

The rolls 18 are so arranged that one roll of the pair runs at a faster surface speed than the other, in order to produce a wiping or churning action of the clay. This may be accomplished by driving one roll of the pair faster than the other or, as shown in the drawings, by making the upper roll of larger diameter than the lower roll.

The second pair of rolls, indicated at 18a, are preferably arranged so that the lower roll of the pair runs at a higher surface speed than the corresponding upper roll, this being accomplished in the drawings by making the lower roll 18a of greater diameter than the upper roll 18a.

The order is again reversed in the third pair of rolls 18b, the upper roll of said pair being larger than the corresponding lower roll. The rolls of each pair are geared together so as to run at an equal angular velocity but at different peripheral speeds, and by alternately locating the larger roll above and below in successive pairs, a wiping or churning action is set up within the clay, producing a uniform texture or structure and eliminating excess air and moisture from the clay, as well as reducing the cross section of the clay ribbon or strip.

The final pair of rolls, indicated at 18c, may both operate at the same surface speed in order to reduce the clay strip to the desired cross section and feed the same forward to the plunger mechanism which will be later described.

The upper rolls are journaled in vertically adjustable bearings 20 adapted to be held in any desired adjusted position as by the adjusting screws 21. As best shown in Fig. 4, each succeeding pair of rolls may be located closer together than the preceding upper pair so as to successively reduce the thickness of the clay column 12, finally rolling the same into a thin strip or ribbon as shown at A.

By this successive rolling of the clay, excess moisture is squeezed therefrom and the molecules of the material are brought into a much closer proximity to each other, substantially excluding all air from the clay, thus producing a continuous strip or ribbon of uniform texture and of a controllable moisture content and controlled molecular contact which will dry and burn faster than under ordinary practice and will produce a tougher and higher quality of pottery ware.

The rolls are preferably formed of suitable moisture absorbing material, such as plaster of Paris or the like, or the surfaces of these rolls may be covered with any suitable moisture absorbing material. If desired, each of the rolls 18, 18a, 18b and 18c, or any of them, may be hollow as shown at 18d in Fig. 7, for the purpose of introducing water or other lubricating agent thereto, or if desired, a heating element as shown at 17 in said figure, may be located within the hollow roll for drying purposes. If it is desired to exteriorly lubricate the rolls to prevent the clay from adhering thereto, means may be provided for supplying water or other lubricant to the rolls.

For this purpose, a pan or tank 22 may be located beneath the rolls for containing suitable lubricating liquid and a plurality of wire frames 23 may be mounted within the pan and adapted to rest against the lower rolls, these frames being covered with fabric as shown at 24, which extends below the liquid level in the pan and contacts with the surface of the corresponding lower roll so as to supply lubricant thereto.

A shaft 25 is journaled in bearings 26 upon the frame of the machine and a sprocket wheel 27 is fixed upon the shaft 25 and is connected by a chain 28 with a sprocket wheel 29 fixed upon the shaft 30 which is journaled in the side frames 16. A second sprocket wheel 31 is fixed upon the shaft 30 and connected by a chain 32 with a sprocket wheel 33 upon the shaft 34 upon which is fixed the lower roll of the last pair of rolls. Another sprocket wheel 35 is fixed upon the shaft 34 and a chain 36 connects the same with a larger sprocket wheel 37 upon the shaft 38 upon which is fixed the lower roll of the third pair of rolls.

A smaller sprocket wheel 39 is also fixed upon the shaft 38 and is connected by the chain 40 with a larger sprocket wheel 41 upon the shaft 42 upon which is fixed the lower roll of the second pair of rolls. A smaller sprocket wheel 43 is also fixed upon the shaft 42 and is connected by a chain 44 with a slightly larger sprocket wheel 45 upon the shaft 46 upon which is fixed the lower roll of the first pair of rolls.

Gearing which will be later described connects the upper and lower roll of each pair so as to drive the same in unison. It will be seen from the sprocket and chain gearing shown on Fig. 2 that each pair of rolls is thus driven at a faster surface speed than the next preceding pair in order to compensate for the successively decreasing thickness of the clay strip or ribbon.

The shaft 34, upon which is mounted the lower roll 18c of the last pair of rolls, may be the drive shaft, being adapted to be connected to any suitable source of power adapted to intermittently drive said shaft. Each of the lower roll shafts 34, 38, 42 and 46 has mounted thereon a pinion 48, and has pivotally mounted thereon a bracket 49 upon which are journaled pinions 50 and 51, the pinion 50 meshing with the pinions 48 and 51, the bracket 49 being free to rotate around the roll shaft.

A pinion 52 is mounted upon each upper roll shaft 47, and meshes with the corresponding pinion 51, the pinions 51 and 52 being held together by means of a link 49a which is free to rotate around the shaft 47 and the pin upon which the pinion 51 is journaled.

The table 53 extends beyond the rolls 18, being supported by crosspieces 15a attached to the uprights 15 and substantially midway between said crosspieces is provided with an opening 54 of a size and shape corresponding to the size and shape of the bat to be formed.

A vertically movable plunger is mounted above the opening 54 in a framework connected to the uprights 15 and including the upper and lower crosspieces 55 and 56 respectively. This plunger includes a stem comprising the spaced outer and inner tubes 57 and 58 respectively, which may be fixedly connected together in any suitable manner, the outer tube 57 being slidably mounted through openings 59 in the crosspieces 55 and 56 and being provided with a collar 60, a coil spring 61 surrounding said outer tube and being interposed between the lower crosspiece 56 and the collar 60 so as to normally hold said collar in contact with the underside of the upper crosspiece 55 when the plunger is in the raised or inoperative position as shown in Fig. 4. The plunger indicated at 62 may be of sheet metal or the like connected to the lower end of the inner tube 58 as by the inverted conical member 63 and may be cylindrical or of other shape corresponding to the opening 54.

A cutter 64 of the exact size and shape of the opening 54 is provided upon the plunger extending downward below the lower edge of the same for cutting a disk of clay from the ribbon A, as indicated at B in Figs. 2, 5 and 6. This cutter may be formed of sheet metal and fitted around the outside of the plunger, and for the purpose of pressing the clay disk or bat B firmly upon the mold indicated generally at 65, the plunger may be provided with a resilient cushion, preferably in the form of a pneumatic diaphragm 66. The edges of this diaphragm may be located between the plunger proper 62 and the cutter 64, as indicated at 67, the plunger having an annular groove 68 therein and a ring 69 being provided for forcing the edge portion of the diaphragm into this groove and wedge fitting the same between the plunger proper and the cutter. Compressed air from any suitable source may be admitted to the inner tube 58 when it is desired to press the bat upon the mold, as will be later described.

The plunger is normally held in raised position, as shown in Fig. 4, by means of the spring 61 which urges the collar 60 upward against the crosspiece 55, and may be moved downward at proper intervals, by any suitable intermittently operating mechanism, in order to cut bats from the clay strip or ribbon and place them upon the molds.

If desired, the molds may be intermittently moved upon a carrier and positioned beneath the opening 54 at the proper time to receive a bat cut from the clay ribbon as the plunger descends. For this purpose an endless carrier in the form of a belt 70 may be arranged to operate beneath the portion of the table 17 which extends between the uprights 15 and preferably located at right angles thereto, as shown in Fig. 3. This belt may be located over rolls or pulleys 71 fixed upon shafts 72 journaled in bearings 73, one of the shafts having a bevel pinion 74 thereon meshing with a similar pinion 75 upon the shaft 25 so that the belt 70 will operate in unison with the clay strip or ribbon. If means are provided for intermittently driving the shaft 34, it will be seen that the belt 70 carrying the molds will be stopped at the same time the clay ribbon is stopped.

It should be understood that the plunger may be so mounted as to move the necessary distance parallel to the movement of the mold, so that the operation may be carried out without entirely stopping the movement of the clay ribbon and mold carrier as the molds may be so positioned upon the belt 70 and the movement of the plunger may be so rapid relative to the movement of the molds and clay ribbon that a bat may be cut from a clay strip and positioned upon a mold which at that instant is directly beneath the opening 54 and the plunger withdrawn rapidly enough to not seriously interfere with the movement of the clay ribbon.

The object may be attained by simply slowing down the drive shaft 34 with each operation of the plunger, so as not to necessitate the constant stopping and starting of the pug mill. The belt 70 may be provided at intervals with holders 76 to receive the molds 65 which may be placed in the holders at one end of the belt and removed with the bat thereon at the other end of the belt and then placed upon a jigger where the bat may be shaped into a dish or other desired article as in usual practice.

For the purpose of carrying the clay ribbon across the table 17, a roller 77 may be fixed upon the shaft 30 and located through a slot 78 in the table and pulleys 79 may be located upon the end portions of the shaft 30, endless belts 80 extending over said pulleys and over similar pulleys 81, 82 and 83 located in substantially a rectangle so that the belts 80 will carry the clay strip across the opening 54 of the table 17 and then carry the waste portion of the strip downward, as indicated at 84, and discharge the same into any suitable receptacle from which it may be conveyed back to the pug mill if desired.

As the plunger descends and cuts a bat from the clay ribbon, compressed air may be admitted to the inner tube 58 to press the bat firmly over the entire surface of the mold as shown in Fig. 2, and as the plunger starts to ascend, the air may be gradually released from the diaphragm so as to prevent the same from dislodging the bat from the mold, the diaphragm first releasing the peripheral portions of the bat as shown in Fig. 5 and finally engaging only the central portion of the bat as shown in Fig. 6, just prior to the raising of the plunger entirely out of contact with the bat.

If desired, a wedge collar 85 may surround the plunger, being adapted to enlarge the opening in the clay ribbon as shown at 86 after the cutter has passed through the same so as to permit the plunger to pass freely upward through said opening on the return stroke.

We claim:

1. Apparatus for manufacturing pottery ware including means for forming plastic clay into a long, thin strip, a table having an opening therein of the size and shape of a bat required for the article to be formed therefrom, means for moving the clay strip over said table, and a plunger shaped to conform to said opening and cooperating with the opening to cut a bat from said clay strip.

2. Apparatus for manufacturing pottery ware including means for forming plastic clay into a long, thin strip, a table having an opening therein of the size and shape of a bat required for the article to be formed therefrom, means for moving the clay strip over said table, and a plunger having a cutter shaped to conform to said opening and cooperating with the opening to cut a bat from said clay strip.

3. Apparatus for manufacturing pottery ware including means for forming plastic clay into a long, thin strip, a table having an opening therein of the size and shape of a bat required for the article to be formed therefrom, means for moving the clay strip over said table, a mold beneath said opening in the table, and a plunger shaped to conform to said opening and cooperating with the opening to cut a bat from said clay strip and place the bat upon said mold.

4. Apparatus for manufacturing pottery ware including means for forming plastic clay into a long, thin strip, a table having an opening therein of the size and shape of a bat required for the article to be formed therefrom, means for moving the clay strip over said table, a mold beneath said opening in the table, and a plunger shaped to conform to said opening and cooperating with the opening to cut a bat from said clay strip and having a cushion adapted to firmly press the bat upon said mold.

5. Apparatus for manufacturing pottery ware including means for forming plastic clay into a long, thin strip, a table having an opening therein of the size and shape of a bat required for the article to be formed therefrom, means for moving the clay strip over said table, a mold beneath said opening in the table, and a plunger shaped to conform to said opening and cooperating with the opening to cut a bat from said clay strip and having a pneumatic diaphragm adapted to firmly press the bat upon said mold.

6. Apparatus for manufacturing pottery ware including means for forming plastic clay into a long, thin strip, a table having an opening therein, means for moving molds beneath said table, and a plunger cooperating with the opening in the table for cutting bats from said strip of clay and placing the bats upon said molds.

7. Apparatus for manufacturing pottery ware including means for forming plastic clay into a long, thin strip, a table having an opening therein, means for moving molds beneath said table, and a plunger cooperating with the opening in the table for cutting bats from said strip of clay and a cushion upon said plunger for firmly pressing the bats upon said molds.

8. Apparatus for manufacturing pottery ware including means for forming plastic clay into a long, thin strip, a table having an opening therein, means for moving molds beneath said table, and a plunger cooperating with the opening in the table for cutting bats from said strip of clay and a pneumatic diaphragm upon said plunger for firmly pressing the bats upon said molds.

9. Apparatus for manufacturing pottery ware including a table having an opening therein, rolls for rolling plastic clay into a long, thin strip and passing said strip over said table, a carrier beneath the table for passing molds beneath said opening, a plunger cooperating with said opening for cutting bats from the strip of clay and placing the bats upon said molds, and means for operating the rolls and carrier in unison.

10. Apparatus for manufacturing pottery ware including a plurality of pairs of upper and lower rolls for forming plastic clay into a long, thin strip, and means for driving each alternate upper and lower roll at higher surface speed than the other rolls.

11. Apparatus for manufacturing pottery ware including means for forming plastic clay into a long, thin strip, and means for alternately wiping opposite sides of said strip to remove excess air and moisture therefrom.

FRANK H. SEBRING, Jr.
LUDWIG C. LOSCHKY.
JOHN T. PUGH.